UNLOADING MECHANISM FOR A STORAGE STRUCTURE

Filed Oct. 23, 1965 10 Sheets-Sheet 1

INVENTOR
JOHN W. SCHAEFER
BY
Andrus & Starke
ATTORNEYS

UNLOADING MECHANISM FOR A STORAGE STRUCTURE

Filed Oct. 23, 1965

INVENTOR.
JOHN W. SCHAEFER
BY
Andrus & Starke
ATTORNEYS

INVENTOR
JOHN W. SCHAEFER
BY
Andrus & Starke
ATTORNEYS

Oct. 1, 1968 J. W. SCHAEFER 3,403,795

UNLOADING MECHANISM FOR A STORAGE STRUCTURE

Filed Oct. 23, 1965 10 Sheets-Sheet 4

INVENTOR
JOHN W. SCHAEFER
BY
Andrus & Starke
ATTORNEYS

UNLOADING MECHANISM FOR A STORAGE STRUCTURE

INVENTOR
JOHN W. SCHAEFER
BY
Andrus & Starke
ATTORNEYS

INVENTOR
JOHN W. SCHAEFER
BY
Andrus & Starke
ATTORNEYS

Oct. 1, 1968 J. W. SCHAEFER 3,403,795

UNLOADING MECHANISM FOR A STORAGE STRUCTURE

Filed Oct. 23, 1965 10 Sheets-Sheet 7

INVENTOR
JOHN W. SCHAEFER
BY
Andrus & Starke
ATTORNEYS

UNLOADING MECHANISM FOR A STORAGE STRUCTURE

Filed Oct. 23, 1965 10 Sheets-Sheet 8

INVENTOR
JOHN W. SCHAEFER
BY
Andrus & Starke
ATTORNEYS

INVENTOR
JOHN W. SCHAEFER
BY
Andrus & Starke
ATTORNEYS

INVENTOR
JOHN W. SCHAEFER
BY
Andrus & Starke
ATTORNEYS 3,403,795
Patented Oct. 1, 1968

3,403,795

UNLOADING MECHANISM FOR A STORAGE STRUCTURE

John W. Schaefer, Barrington, Ill., assignor to A. O. Smith Harvestore Products, Inc., Arlington Heights, Ill., a corporation of Delaware Filed Oct. 23, 1965, Ser. No. 503,520
33 Claims. (Cl. 214—17)

ABSTRACT OF THE DISCLOSURE

The invention relates to an unloading mechanism for a storage structure including a cutter arm which is mounted for rotation about the center of the structure and the cutter arm includes a pair of cutter cylinders located generally one above the other. A series of teeth are mounted on the outer surface of each of the cutter cylinders and as the cutter arm rotates the cylinders rotate about their axes and move into the mass of stored material to dislodge the same. Located behind the cutter cylinders, in the direction of rotation of the cutter arm, is an auger which serves to convey the dislodged material to the center of the structure and deposit the material in a radially extending trough formed in the foundation. Dual auger conveyors operating within the trough serve to convey the material to the exterior of the storage structure.

This invention relates to a storage structure and more particularly to an apparatus for unloading a stored material from a storage structure such as the silo.

Silage and other similar products are frequently stored in a sealed silo or storage structure to prevent air from contacting the silage and thereby minimize spoilage. In this type of silo the material is normally removed by a bottom unloader of the type shown in the patent to Tiedemann No. 2,635,770. With this conventional type of bottom unloader, a cutter arm is mounted for rotation at the center of the silo and rotates across the floor. The arm carries an endless chain having teeth mounted thereon which cut and dislodge the silage and move the dislodged silage toward the center of the silo where it falls into a radially extending trough. A conveyor located within the trough moves the silage to the exterior of the silo. With this type of unloading mechanism, the silage is removed with a minimum exposure to the atmosphere thereby reducing spoilage.

The chain-type cutter arm is entirely satisfactory for removing the fibrous materials such as silage which are generally in a hard packed condition, but because of the articulated nature of the roller chain, which includes numerous links and connecting pins, the speed of travel of the chain is generally limited to about 130 feet per minute and this of course limits the output or capacity of the unloader. With large silos, having a diameter of 25 feet or more, an increased output is desired over and above that which can be derived from the conventional chain-type cutter arm.

The present invention is directed to an improved unloading mechanism for a storage structure having a substantially increased output or capacity and which is particularly adapted for use with large diameter silos or storage structures. The unloader of the invention includes a cutter arm which is mounted for rotation about the center of the silo and the cutter arm includes a pair of cutter cylinders located generally one above the other. A series of teeth are mounted on the outer surface of each of the cutter cylinders and as the cutter arm rotates, the cylinders rotate about their axes and move into the silage mass and shred and dislodge the silage. Located behind the cutter cylinders, in the direction of rotation of the cutter arm, is an auger which serves to convey the dislodged silage to the center of the silo and deposits the silage in a radially extending trough formed in the foundation. Dual auger conveyors operating within the trough serve to convey the silage to the exterior of the silo.

The cutter arm, instead of being driven from its inner end at the center of the silo, is driven from its outer end adjacent the silo wall and this substantially reduces the moment arm developed on the cutter arm. To drive the cutter arm, a drive shaft is located within the lower of the two cutter cylinders and the outer end of the shaft carries a sprocket which engages a series of pins extending inward from a drive ring attached to the silo wall. Rotation of the drive shaft and sprocket serves to rotate the cutter arm around the silo.

As an additional feature, the unloader includes an entry tool which is located diametrically opposite the cutter arm. The entry tool includes a pair of heads, each having a series of cutter teeth, and the heads are adapted to rotate about their axes as the unit is installed within the silo. The entire unloading unit, including the cutter arm, entry tool, conveyor and trough are integral, and to install the unit the cutter arm is positioned above the conveyor with the entry tool facing inwardly toward the center of the silo. As the unit is moved into the mass of silage the entry tool cuts a path into the silage mass and the cut silage falls downwardly into the trough where it is conveyed to the exterior of the silo by the conveyor.

The unloader of the invention substantially increases the capacity or silage output over the conventional bottom type unloading mechanism and in most cases, the increase in capacity will be 3 to 10 times that of the conventional chain-type unloader.

The present unloader also eliminates the inherent problems which are encountered with the use of a long endless cutter chain due to the fact that the chain contains numerous links, pins and other moving parts. This not only decreases the cost by reducing the number of moving parts, but also eliminates many points of potential wear and problems of clogging, jamming or freezing of the chain elements.

As the entire unloading unit, including the cutter arm and conveyor are an integral package, the unloader can be moved from silo to silo. This is a substantial advantage over the prior types of unloaders which require a separate unloader for each silo.

Other objects and advantages will appear in the course of the following description.

The drawings illustrate the best mode presently contemplated of carrying out the invention.

Figures 1, 5:
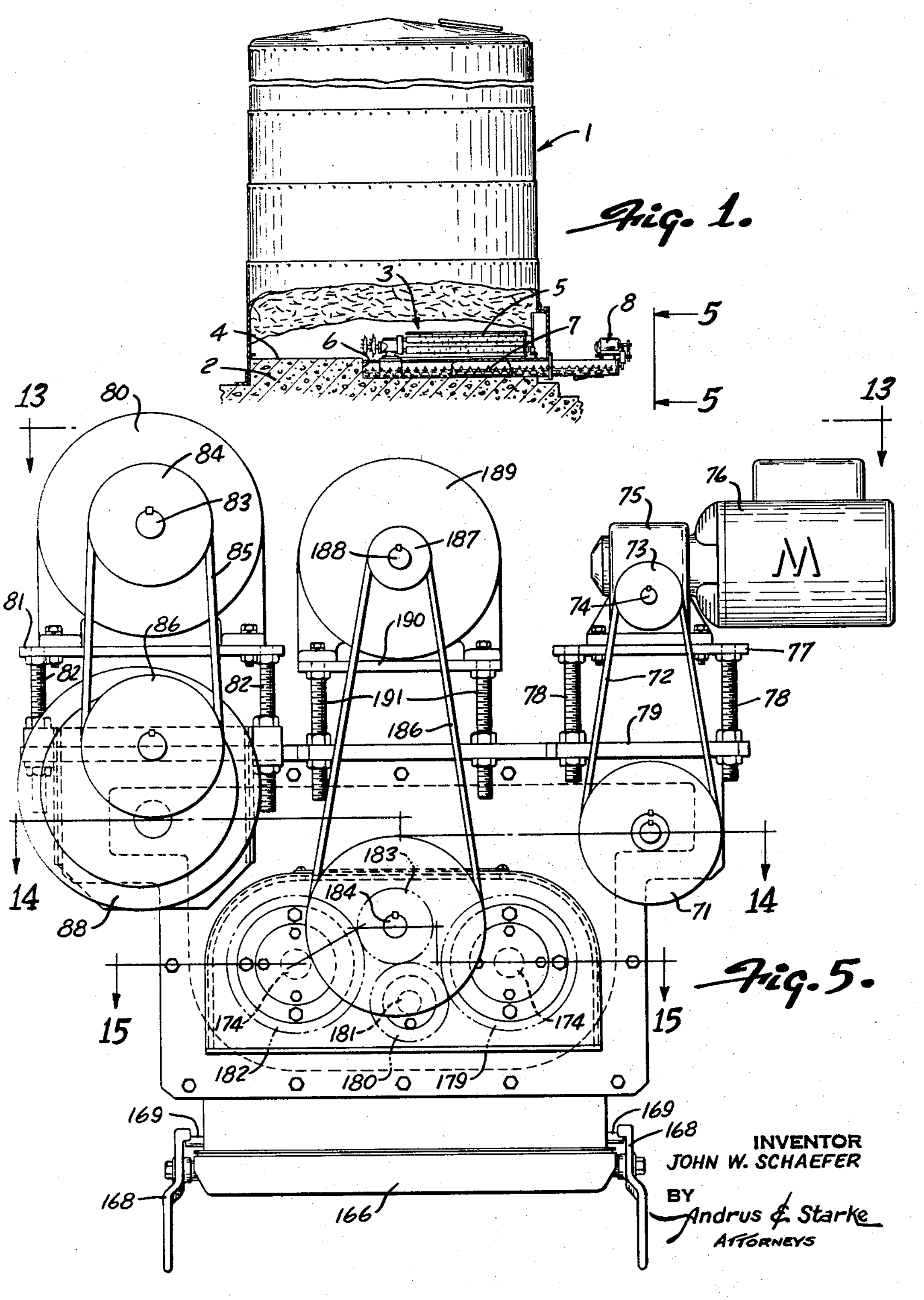
FIG. 1 is a side elevation, with parts broken away, of a silo incorporating the unloading mechanism of the invention.
FIG. 5 is an end view of the trough and drive mechanism taken along line 5—5 of FIG. 1.

The drawings illustrate a storage structure or silo 1 which is mounted on a foundation 2 and is adapted to contain a stored material such as silage or the like. The stored material is removed from the silo 1 by an unloader unit 3 which is mounted above the floor 4 of the silo. The unloader unit 3, in general, includes a cutter arm 5 which is mounted for rotation at the center of the silo and rotates over the floor to cut and dislodge the silage and move the dislodged silage to the center of the silo where it is deposited in a radially extending trough 6 formed in the foundation 2. A conveyor unit 7 mounted within the trough 6 serves to convey the dislodged silage to the exterior of the silo. The cutter arm 5 and the conveyor unit 7 are both driven by a drive unit, indicated generally by 8, which is mounted on the conveyor unit 7 outside of the silo.

The cutter arm 5 or silage dislodging mechanism includes a pair of cutter cylinders 9 and 10 and an auger 11, all of which extend radially outward from the center housing 12 located at the center of the silo. The cylinders 9, 10, auger 11 and housing 12 are an integral unit and rotate together within the silo.

Figure 2:
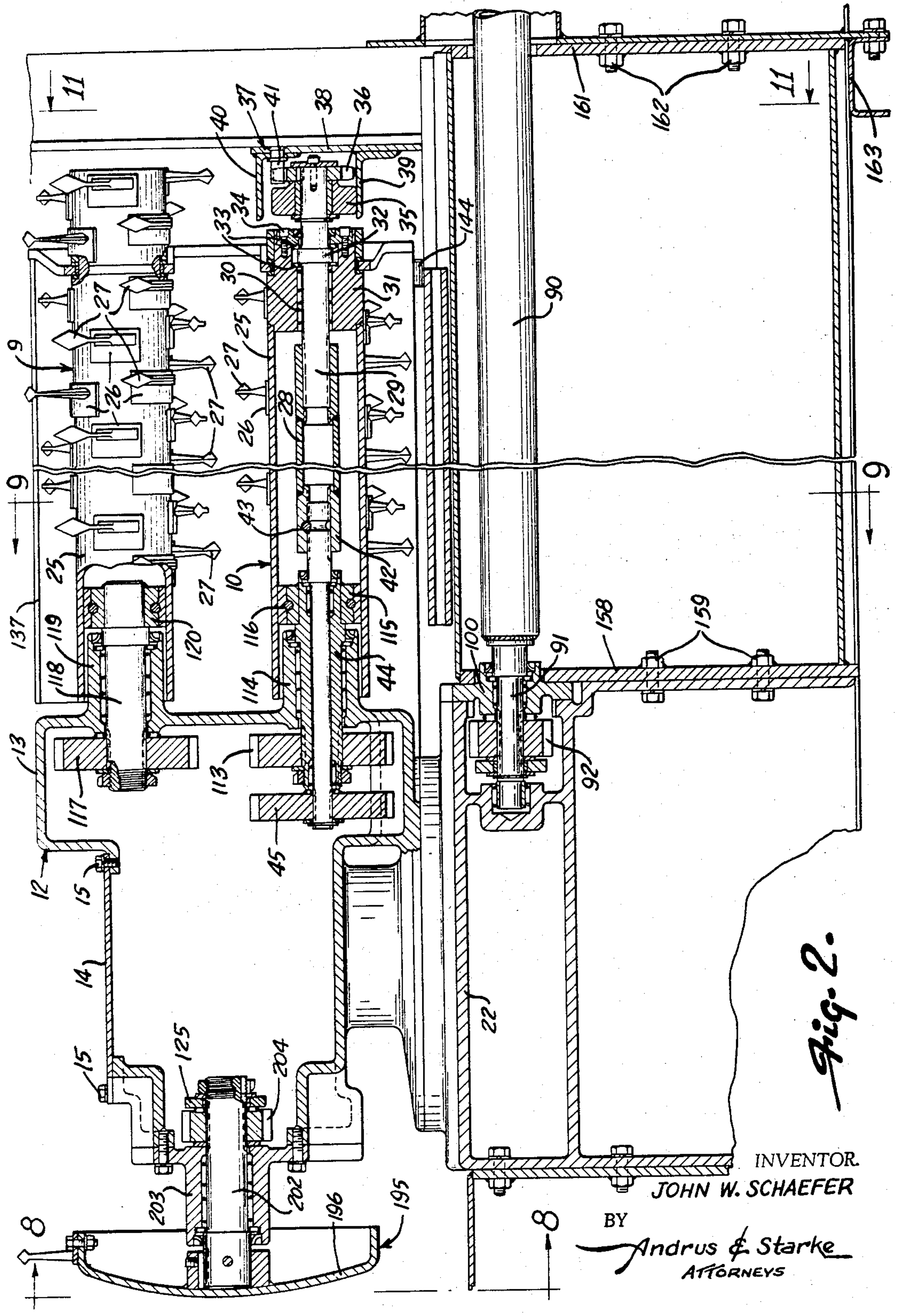
FIG. 2 is a vertical section of the unloader as installed in the silo and taken on line 2—2 of FIG. 9.

As shown in FIG. 2, the housing 12 includes a central housing section 13 having an opening in the top which is enclosed by a top plate 14 connected by bolts 15 to the housing section. The side of the central housing section 13 is provided with an opening which is enclosed by a cap 16 which is connected to the housing section 13 by bolts 17.

Figure 6:
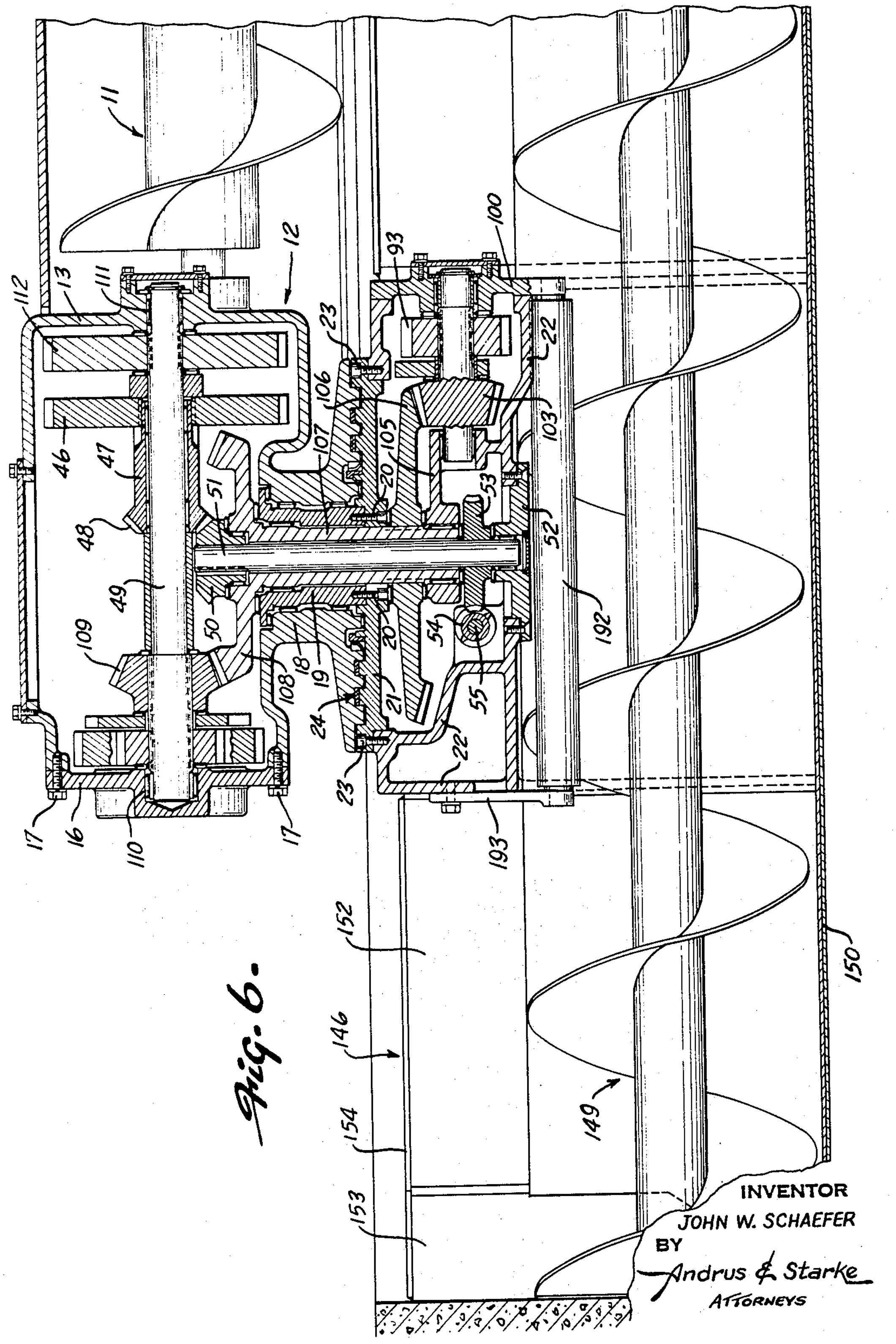
FIG. 6 is a vertical section taken along line 6—6 of FIG. 9.

As best shown in FIG. 6, the lower end of the central housing section 13 defines a hub 18 which is journaled for rotation about a stationary sleeve 19 connected by bolts 20 to a plate 21. Plate 21 is secured across the opening in the upper end of base casting 22 by a series of bolts 23. During operation of the unloader, the hub 18 rotates with respect to the sleeve 19 and plate 21, and to prevent silage or other stored material from moving inwardly between the joint between the members, the mating surfaces of the hub 18 and plate 21 are provided with a series of annular grooves and ridges, indicated generally by 24. The mating grooves and ridges provide a labyrinth-type of path to thereby prevent the silage from moving inwardly between the members and contacting the bearings.

Figure 9:
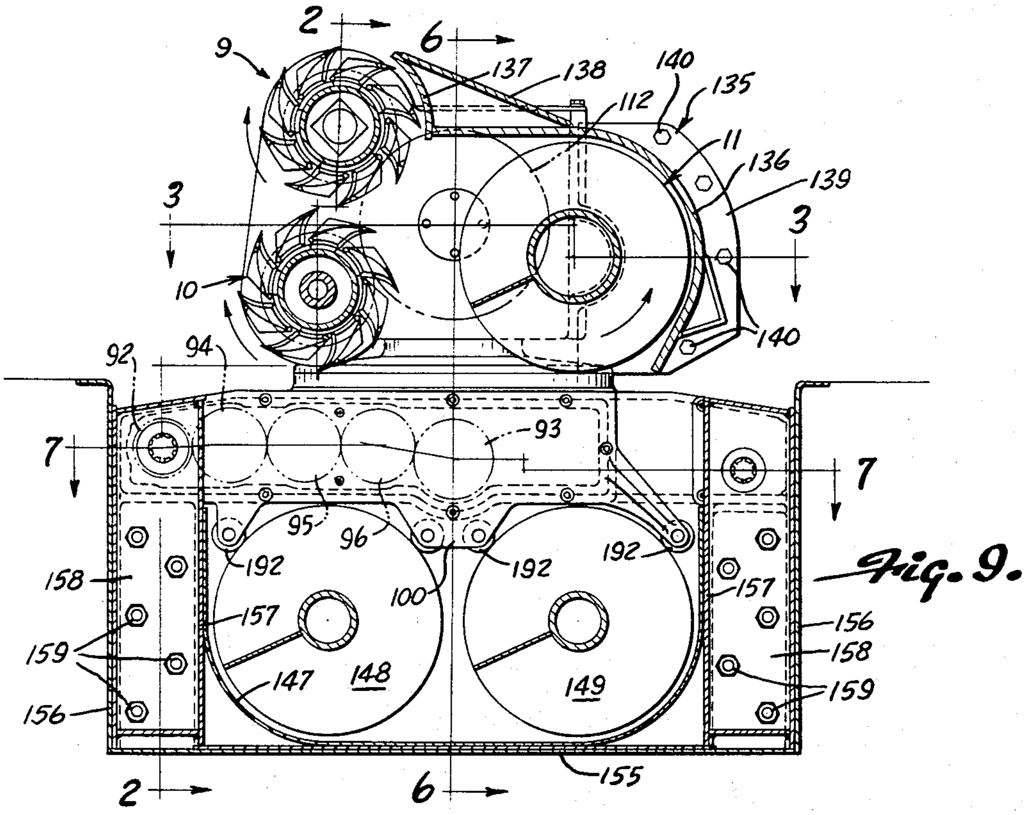
FIG. 9 is a vertical section taken along line 9—9 of FIG. 2.

The cutter cylinder 9 is located generally above the cutter cylinder 10 and the axes of the cylinders 9 and 10 lie on a circle having its center coinciding with the axis of the auger 11. As shown in FIG. 9, the axis of the lower cutter cylinder 10 is advanced forwardly in the direction of cutter arm movement, from the axis of the upper cutter cylinder 9. However, this is not a critical relationship and the axes of the cylinders 9 and 10 can be in vertical alignment, or alternatey, the axis of the cylinder 9 can be advanced in the direction of cutter arm travel beyond that of the cylinder 10.

Each of the cylinders 9 and 10 include an outer cylindrical sleeve 25 and a series of plates or lugs 26 are secured to the outer surface of the sleeve 25 and carry teeth 27. As best shown in FIG. 2, the teeth 27 have thin bodies which terminate in enlarged diamond shaped heads which are pointed in the direction of rotation of the cylinders. As the cylinders rotate the pointed tips penetrate into the silage mass and the large diamond shaped heads serve to shred and dislodge the silage. The thin bodies of the teeth generally lie in planes perpendicular to the axis of the respective cylinder so that the power requirement necessary to move the teeth through the silage is minimized.

The silage which has been dislodged by the cutter cylinders 9 and 10 is then conveyed radially inwardly toward the center of the silo by the auger 11 which is located generally parallel to the cutter cylinders 9 and 10. According to the invention the cutter arm 5, including the cylinders 9 and 10 and auger 11, is driven from its outer end rather than from its inner end. To provide the drive, a tube 28 is located within the cylindrical sleeve 25 of the lower cutter cylinder 10 and the outer end of the tube 28 receives the inner end of a shaft 29, while the central portion of shaft 29 is journaled by bearings 30 within a ring 31 welded to the outer end of the cylinder 25. Shaft 29 carries a collar 32 and thrust bearings 33 are located on opposite sides of the collar. The bearings are retained in place by a retaining cap 34 which is bolted to the ring 31.

The outer end of the shaft 29 carries a roller 35 and a sprocket 36. Secured to the inner wall of the silo 1 is a base ring assembly 37 which extends around the silo. The base assembly 37 includes a ring 38 attached to the silo wall and a pair of angles 39 and 40 are mounted in spaced relation on the ring 38. As shown in FIG. 2, the inwardly extending flange of the lower angle 39 forms a track or rail on which the roller 35 rides to support the outer end of the cutter cylinder.

The cutter arm is driven by engagement of the sprocket 36 with a series of pins 41 which extend inwardly from the base assembly 37. As the sprocket 36 is rotated, the sprocket will successively engage the pins 41 to thereby drive the cutter arm around the silo. The flange on the upper angle 40 forms a cover or shield over the sprocket 36 and pins 41 so that the silage will not clog or jam the drive mechanism.

The inner end of the tube 28 is connected to a shaft 42 by a spline and thrust pin assembly 43 and the shaft 42 is journaled within an outer sleeve 44. The inner end of shaft 42 extends within the housing 12 and carries a gear 45 which meshes with the gear 46 mounted on the hub 47 of a bevel gear 48. Bevel gear 48 is driven by a miter gear 50 connected to the upper end of the vertical shaft 51 which is mounted centrally of the silo. The lower end of shaft 51 is journaled within a cap 52 secured within an opening in the base casting 22.

Figure 7:
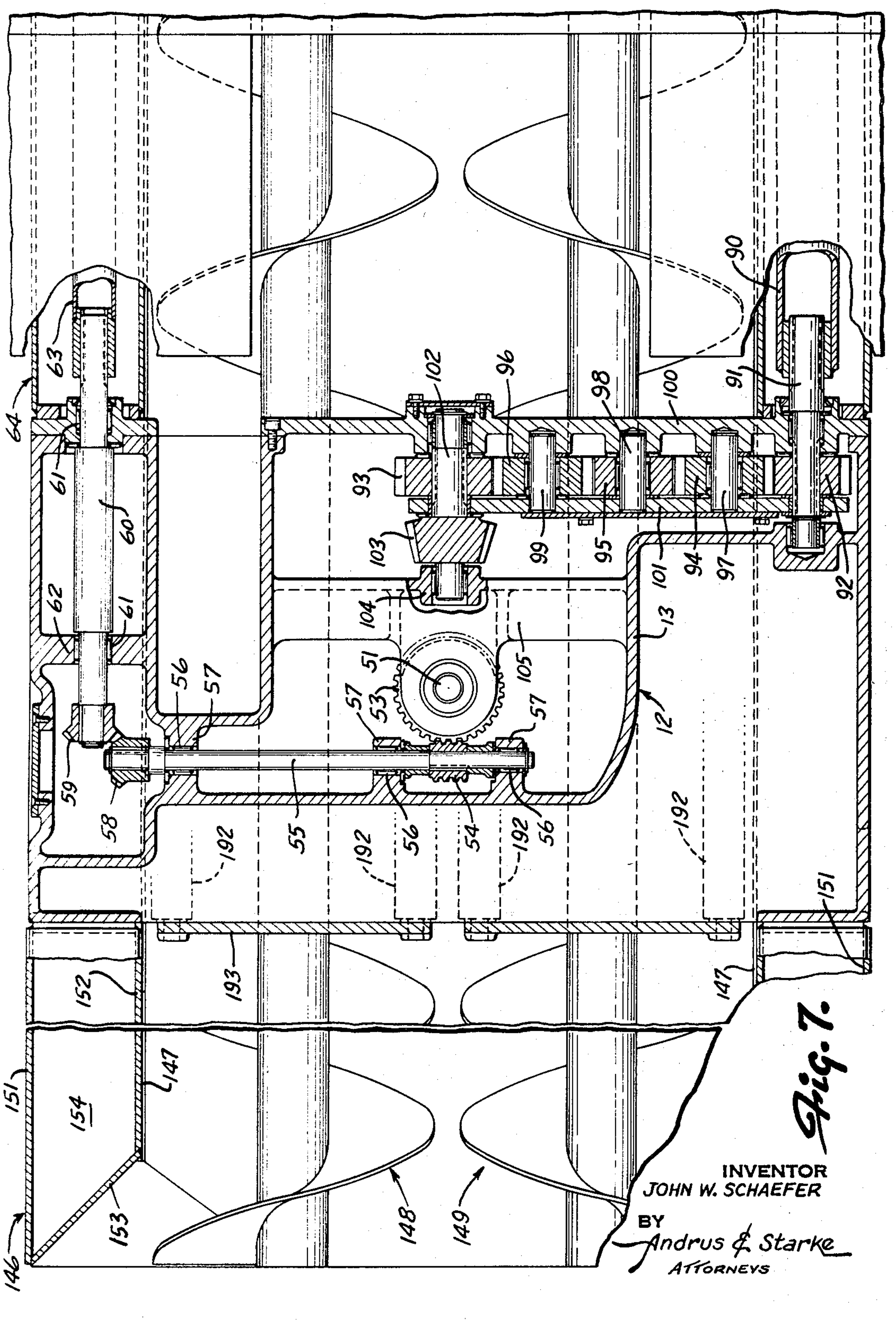
FIG. 7 is a horizontal section taken along line 7—7 of FIG. 9.

The lower end of shaft 51 carries a gear 53 which is driven by a worm 54 mounted on the horizontal shaft 55. As best shown in FIG. 7, shaft 55 is journaled by bearing 56 in lugs or projections 57 which extend inwardly from the wall of the base casting 22. The end of the shaft 55 carries a bevel gear 58 which engages bevel gear 59 on shaft 60. Shaft 60 is journaled within bearings 61 housed within the walls 62 of base casting 22 and the outer end of the shaft 60 is connected to a torque tube 63 which extends within the conveyor housing 64 located within trough 6 in the foundation 2.

The outer end of the torque tube 63 is connected to a stub shaft 65 which is journaled within bearings 66 in block 67 connected to the outer surface of end wall 68 of conveyor housing 64. Shaft 65 is connected to the output side of a clutch 69 while the input shaft 70 to the clutch 69 carries a pair of pulleys 71 which are driven through belts 72 from pulleys 73 mounted on output shaft 74 of speed reducing unit 75. The speed reducing unit 75 is driven by a motor 76. As shown in FIG. 5, the motor 76 and speed reducing unit 75 are mounted on a platform 77 which is connected by studs 78 to a motor support plate 79. By adjustment of the studs 78 the vertical position of the motor 76 can be adjusted to thereby tighten the belts 72.

The motor 76 operating through the speed reducing mechanism 75 rotates the torque tube 63, and rotation of the torque tube acting through bevel gears 58 and 59 drives the worm 54 which in turn rotates the gear 53 and shaft 51. Rotation of the shaft 51 acts through miter gear 50 to rotate gear 48 which in turn rotates gear 46. Gear 46 drives gear 45 and this in turn rotates tube 28 to thereby drive the sprocket 36 and move the cutter arm within the silo.

In addition to the cutter arm 5 rotating within the silo both of the cylinder cutters 9 and 10 as well as the auger 11 are simultaneously rotated about their axes. The drive for rotating the cylinder cutters and the auger 11 includes a motor 80 mounted on platform 81 and the platform 81 is adjustably supported above the support plate 79 by a series of studs 82, as illustrated in FIG. 5. The drive shaft 83 of motor 80 carries a multiple pulley unit 84 which is connected by belts 85 to pulley unit 86 on the input shaft of a speed reducing unit 88. The output shaft 89 of speed reducing unit 88 is connected to the outer end of a torque tube 90 which extends within the conveyor housing toward the base casting 22. As shown in FIG. 7, the inner end of torque tube 90 is connected to a stub shaft 91 which carries a gear 92. Gear 92 drives a gear 93 through a series of idle gears 94, 95 and 96. Gears 94–96 are carried on shafts 97, 98 and 99, respectively, which are journaled within a plate 100 secured to the casting 22 and an inner wall 101 of the casting. Gear 93 is mounted on a shaft 102 which is journaled within the plate 100 and shaft 102 carries a bevel gear 103. The opposite end of the shaft 102 is journaled within a hub 104 formed in wall 105 of casting 22.

As shown in FIG. 6, bevel gear 103 engages gear 106 which is secured to a sleeve 107 which is mounted for rotation about the central shaft 51. The lower end of sleeve 107 is journaled within the wall 105 while the upper end of sleeve 107 is journaled within stationary sleeve 19.

Figures 3, 4:
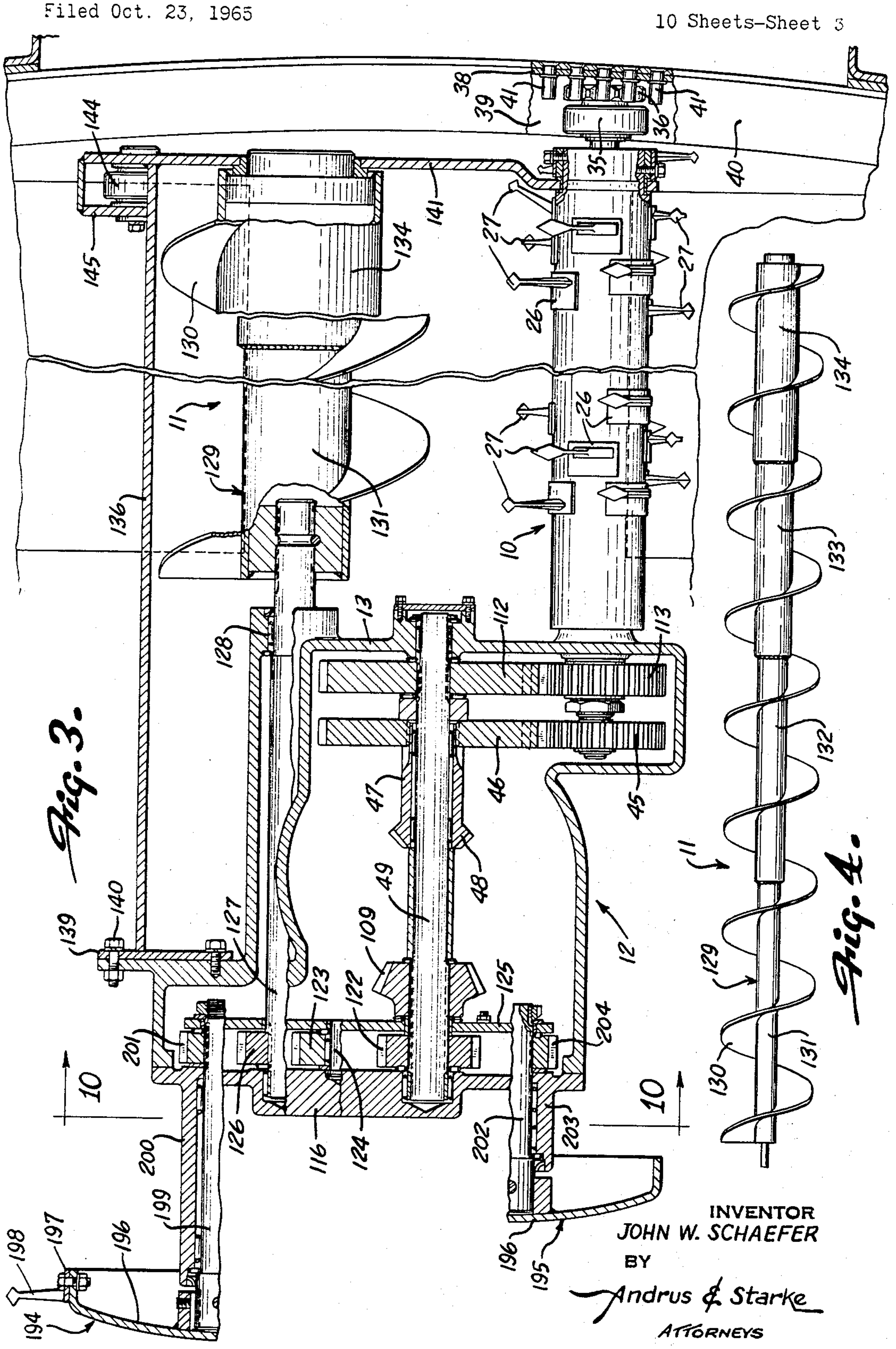
FIG. 3 is a horizontal section of the unloading apparatus taken along line 3—3 of FIG. 9.
FIG. 4 is a side elevation of the auger associated with the cutter arm.

The upper end of sleeve 107 carries a bevel gear 108 which drives gear 109 mounted on the shaft 49. As shown in FIG. 6 the ends of the shaft 49 are journaled within bearing assemblies 110 and 111 mounted in the cap 16 and the housing section 13, respectively. Shaft 49 also carries a gear 112 which drives gear 113, as shown in FIG. 3, carried by the sleeve 44. Referring to FIG. 2, sleeve 44 is mounted for rotation within a hub 114 which is formed in the central section 13 of housing 12. A square collar 115 is secured to the outer end of sleeve 44 and the collar 115 is connected to the outer cylinder 25 of the cutter 10 by shear bolts 116. Thus, rotation of the gear 113 acts to rotate the cylinder 25 about its axis causing the teeth 27 to penetrate and dislodge the silage.

In addition to driving gear 113, gear 112 also engages and drives the gear 117 mounted on shaft 118. Shaft 118 is journaled within hub 119 bored in housing section 13. The outer end of the shaft 118 carries a square collar 120 which is connected to the cylindrical sleeve 25 of the cutter cylinder 9. Thus, rotation of the gear 117 acts through the shaft 118 to rotate cylinder 25 of cutter 9 and thereby move the teeth 27 into contact with the silage mass.

Figure 10:
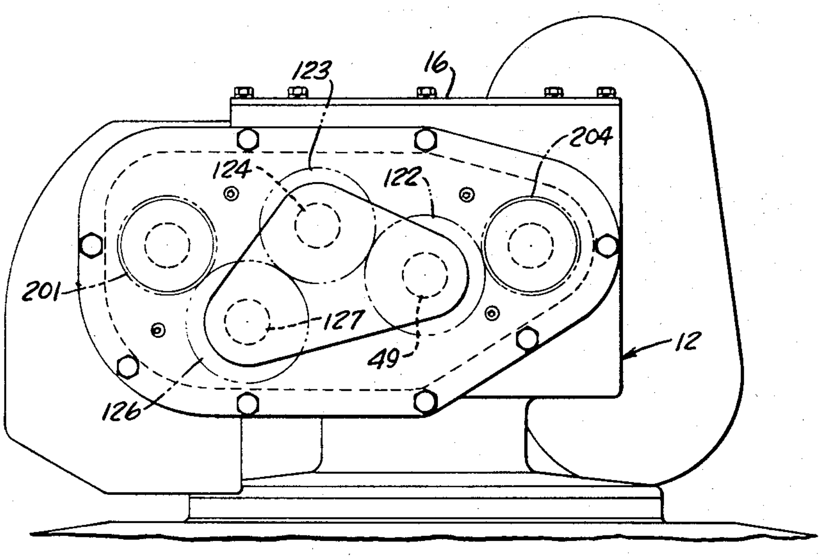
FIG. 10 is a vertical section taken along line 10—10 of FIG. 3.

The drive which is transmitted through torque tube 90 also acts to drive the auger 11 about its axis. Referring to FIGS. 3 and 10, the shaft 49 carries a gear 112 and gear 122 drives idler gear 123 mounted on shaft 124. The shaft 124 is journaled between the cap 16 and a plate 125 which is supported from the housing 13. The idler gear 123 is in engagement with a gear 126 mounted on shaft 127. Shaft 127 extends parallel to shaft 49 and the outer end of the shaft is journaled within a bearing 128. Shaft 127 is connected to the auger shaft 129 and a conventional spiral flighting 130 is welded to the shaft 129. With this drive system, rotation of the shaft 49 operates through gears 122, 123 and 126 to drive shaft 127 which in turn drives the auger 11. Thus, simultaneously with the rotation of the cutter arm 5, the two cutter cylinders 9 and 10, as well as the auger 11, are rotated about their axes. As previously mentioned, the teeth 27 on the cutters 9 and 10 serve to penetrate and dislodge the silage and the auger 11 which is located behind the cutters 9 and 10 in the direction of travel of arm 5, conveys the dislodged silage toward the center of the silo.

The auger shaft 129 is composed of four sections, 131, 132, 133 and 134 and the shaft sections have progressively increased diameters in a direction away from the center of the silo. As best shown in FIG. 4, the outer end of shaft section 131 is welded within the inner end of shaft section 132, and similarly, the outer ends of the shaft sections 132 and 133 are welded within the inner ends of sections 133 and 134, respectively. While the diameters of the shaft sections 131–134 progressively increases, the outer diameter or periphery of the flighting 130 remains constant throughout the length of the auger. This construction provides increased rigidity for the auger throughout its length and progressively increases the conveying capacity in a direction toward the center of the silo and yet maintains a constant overall peripheral dimension of the auger so that the auger will maintain its straight line relationship to the floor 4 of the foundation 2.

The top and rear portions of the cutter arm 5, in the direction of cutter arm rotation, are enclosed by a shield or cover 135. Shield 135 includes a generally curved shield section 136 which encloses the rear of the auger 11 and extends forwardly to a position adjacent the cylinder cutter 9. An upper shield section 137 is connected to the edge of shield section 136 and extends partially above the cylinder cutter 9. Shield sections 136 and 137 are reinforced by a web 138. As best shown in FIG. 3, the inner end of the shield sections 136 and 137 are provided with a flange 139 which is bolted by bolts 140 to the central housing section 13.

Figure 11:
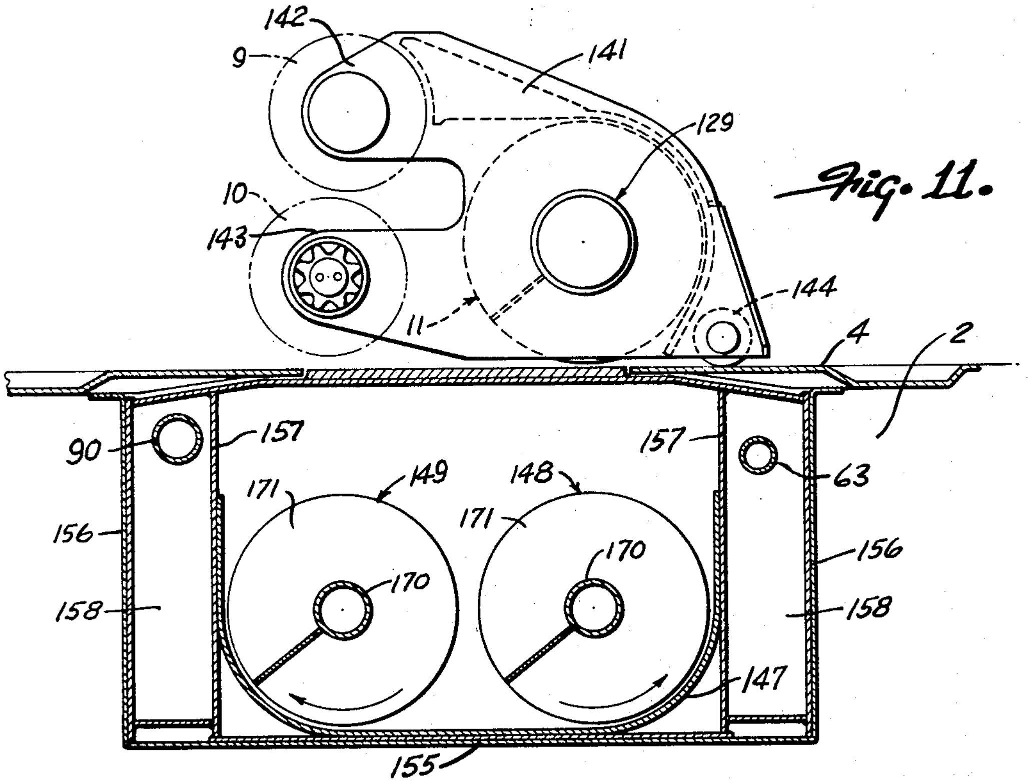
FIG. 11 is a vertical section taken along line 11—11 of FIG. 2 and showing the outer end of the cutter arm in elevation.

Shield 135 also includes an end plate 141 which is most clearly illustrated in FIGS. 3 and 11. The end plate 141 is secured to the outer edges of shield sections 136 and 137 and is provided with a pair of projections 142 and 143 which rotatably support the outer ends of the cutter cylinders 9 and 10, respectively. In addition, the outer end of the auger 11 is journaled within a suitable opening in the end plate 141.

To support the outer end of the cutter arm 5 during rotation, a roller 144 is journaled between the trailing end of the plate 141 and a plate 145 which is parallel to plate 141 and extends outwardly from the shield section 136. Roller 144 rides on the floor 4 of the foundation as the cutter arm 5 is rotated within the silo or storage structure.

As the cutter arm 5 rotates, the cutter cylinders 9 and 10 also rotate about their axes and the teeth 27 cut into and shred the silage or other stored material to dislodge the same. The dislodged silage is then conveyed toward the center of the silo by the auger 11 which is located behind the cutters 9 and 10 in the direction of movement of the arm 5. The auger 5 is adapted to deposit the dislodge silage in the trough 6 and the conveyor unit 7 then conveys the silage to the exterior of the silo 1.

The housing 64 is secured to base casting 22 and extends outwardly within trough 6 to a location on the outside of the silo. In addition to housing 64, a central housing 146 is also secured to base casting 22 and is located on the opposite side of the casting from housing 64 which is located within the trough 6. A generally U-shaped auger support member 147 extends within the housings 64 and 146 and through an opening in base casting 22 and a pair of augers 148 and 149 are located within the U-shaped support member 147. The central housing 146 has an open top to receive silage or other stored material and includes a bottom wall 150 and a pair of side walls 151. In addition a wall 152, as shown in FIG. 7, is spaced laterally of each side wall 151, and walls 152 are arranged flatwise to the side walls of the U-shaped member 147. A diagonal wall 153 connects the end of each wall 152 and the corresponding side wall 151, and a top wall 154 encloses the space between each side wall and the coresponding inner wall 152.

Housing 64 is similar in construction to central housing 146 and includes a bottom wall 155, a pair of side walls 156 and a pair of inner walls 157 which extend parallel to side walls 156 and are secured flat wise to the sides of the U-shaped member 147. As shown in FIG. 11, the torque tubes 63 and 90 extend within the spaces between the side walls 156 and the parallel side walls 157.

To secure housing 64 to base casting 22, vertical webs 158 extend between the side walls 156 and the corresponding walls 157 at the inner end of the housing and webs 158 are secured to the base casting by bolts 159 as illustrated in FIG. 9.

The portion of the housing 64 located adjacent the center of the silo has an open top so that the dislodged silage can fall into the housing where it will be conveyed by the augers 148 and 149 to the exterior. The top of the outer portion of the housing 64 is enclosed by a top plate 160 which is secured to the upper edges of side walls 156 and walls 157, as shown in FIG. 11. The central portion of top plate 160 is of a double thickness in order to support the weight of the silage and the unloader, and is mounted flush with the floor 4.

Figure 14:
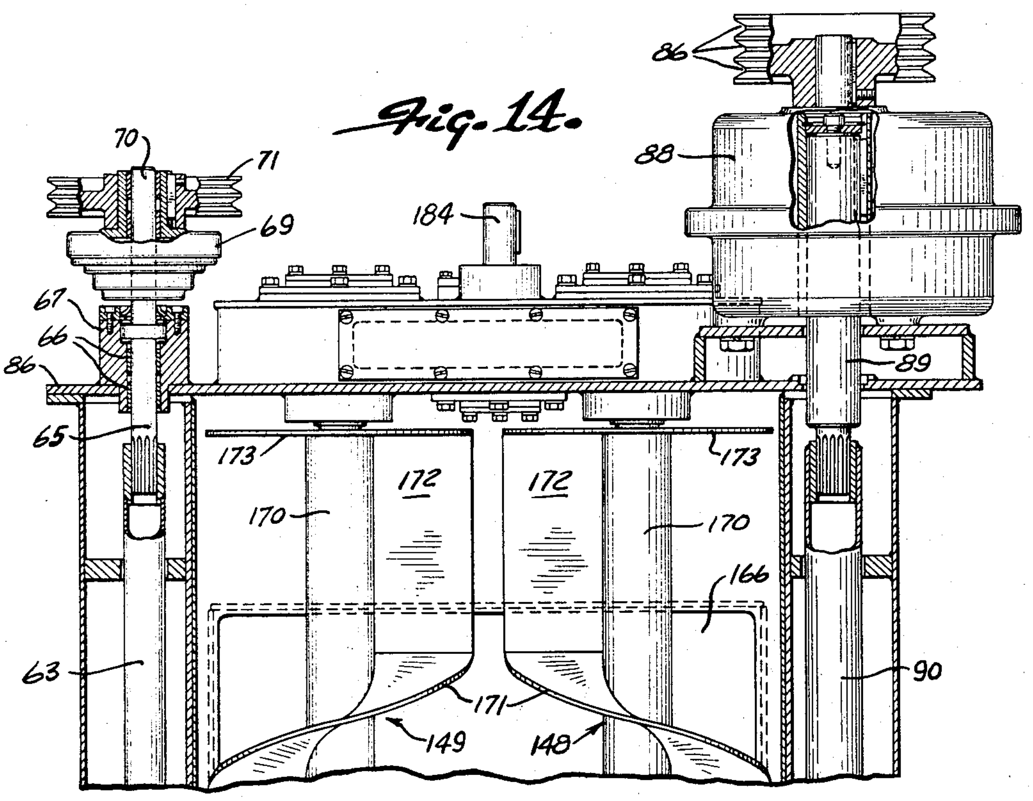
FIG. 14 is a horizontal section taken along line 14—14 of FIG. 5 and showing the drive connections to the torque tubes.
Figure 15:
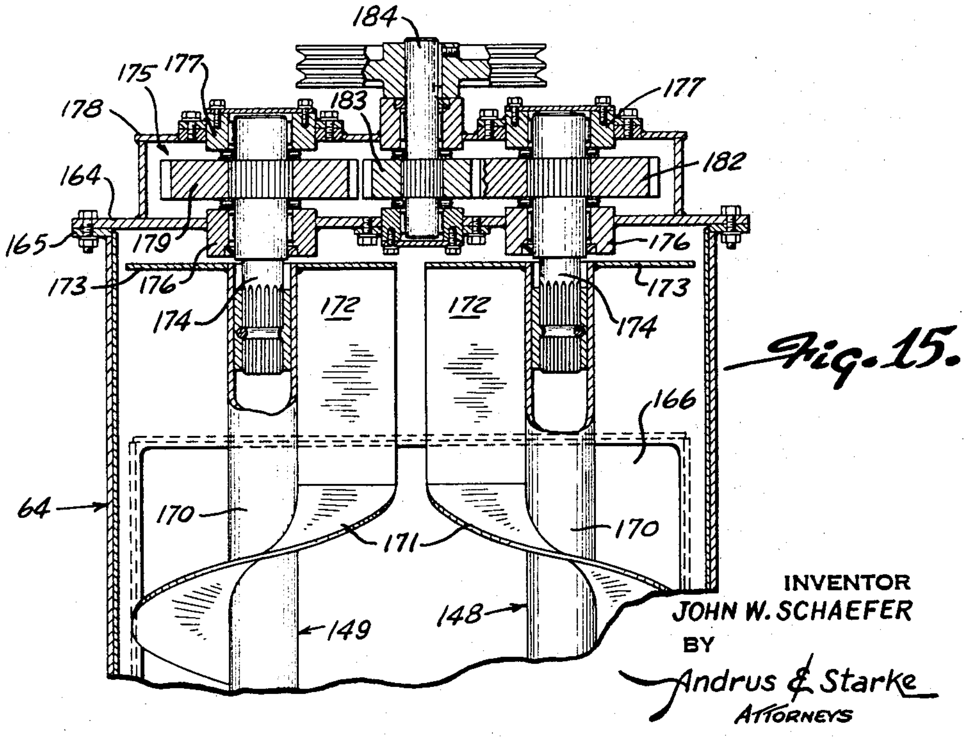
FIG. 15 is a horizontal section taken along line 15—15 of FIG. 5 and showing the gear drive for the auger conveyors.

As previously mentioned, the housing 64 extends outwardly beyond the exterior of the silo 1, and a flange 161 projects from the outer surface of the housing and is secured by bolts 162 to a frame 163 mounted on the wall of the silo. As best shown in FIGS. 14 and 15, an end plate 164 is secured to a flange 165 formed on the outer end of housing 64 to enclose the outer end of the housing.

The silage being conveyed outwardly through the housing 64 by the augers 148 and 149 is discharged through an opening in the lower surface of the housing. The discharge opening can be closed off by a door 166 which is hinged to the bottom surface 155 of the housing by hinges 167. Door 166 can be locked in the closed position by engagement of lever arms 168 with pins 169.

Each auger 148 and 149 includes a shaft 170 and a spiral flight 171. A generally straight blade 172, which extends parallel to the axis of each of the shafts 170, is secured to the outer end of each spiral flight 171. The straight blade 172 provides a beating action which contributes to the efficiency of the material flow into the discharge opening. As best shown in FIGS. 14 and 15, an annular end plate 173 is secured to the outer edge of each blade 172 and to the shaft 170.

Figure 12:
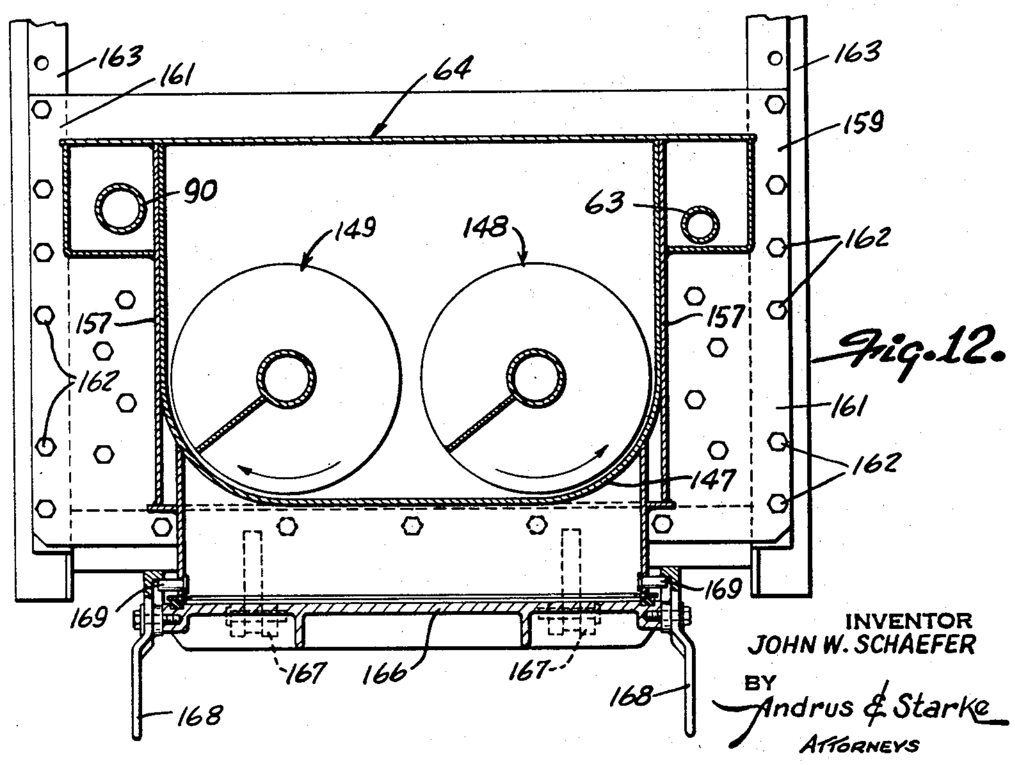
FIG. 12 is a vertical section taken through the conveyor housing showing the augers and the discharge door.
Figure 13:
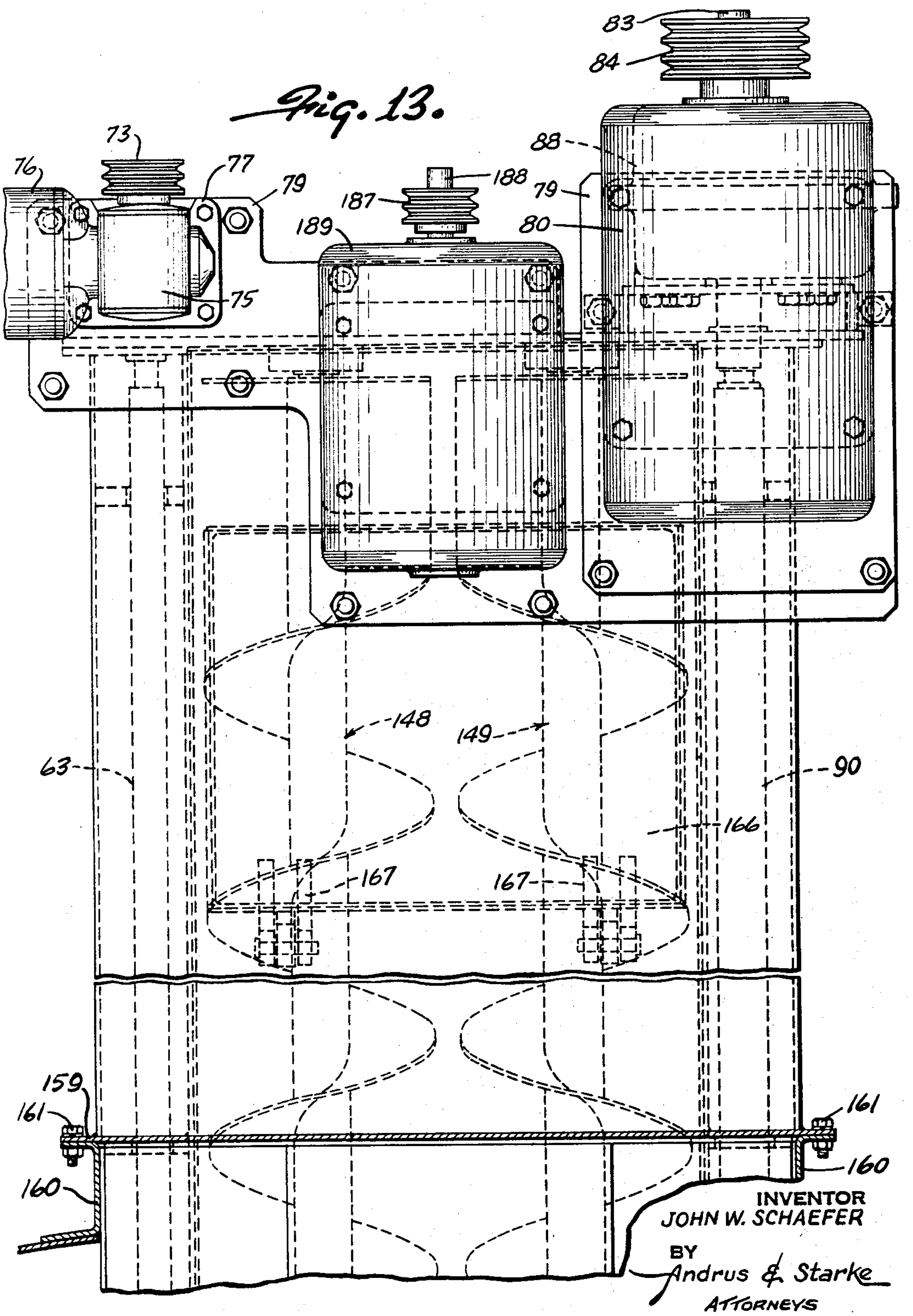
FIG. 13 is a horizontal section taken along line 13—13 of FIG. 5.

To drive the augers 148 and 149, a stub shaft 174 is secured within the outer end of each of the auger shafts 170 and the shafts 174 are driven to a gear drive, disposed in gear box 175. Shafts 174 are journaled within bearings 176 in end plate 162, while the outer ends of the shafts are journaled within bearings 177 located in the cover 178 of gear box 175. The shaft 174 associated with auger 148 carries a gear 179 which meshes with a gear 180 on shaft 181 while the shaft 174 associated with auger 149 carries a gear 182 which is engaged with a drive gear 183 on shaft 184. Rotation of the drive gear 183 not only rotates gear 182, but also gear 180, which in turn drives gear 179 so that the augers 148 and 149 will be rotated in the opposite direction, as shown by the arrows of FIG. 12.

The drive gear shaft 184 carries a series of pulleys 185 which are connected by belts 186 to a series of pulleys 187 on motor drive shaft 188 which is driven by motor 189. Motor 189 is mounted on a platform 190 between the motors 76 and 80, and the platform is supported by adjustable studs 181 above the support plate 79.

The augers 148 and 149 are mounted for rotation within the U-shaped support 147 by a series of rollers 192 which extend parallel to the axes of the auger shafts 170 and as shown in FIG. 9, two of the rollers ride on the peripheral edge of the flight 171 of each auger as the augers rotate. One end of each roller 192 is journaled within an opening in the plate 100 at one end of the base casting 22, which the opposite end of each roller 192 is journaled within the bracket 193 secured to the opposite end of base casting 22. The rollers 192, as best shown in FIG. 6, extend substantially the entire length of the base casting and at least two spaced portions of each spiral flight 171 are in engagement with each roller at a given time. Thus, it is important that the rollers 192 have a length greater than the pitch of the spiral flight 171 so that there will be contact with each flight at more than one point along its periphery.

The use of the rollers 192 in journalling and maintaining position of the augers is a substantial advantage over the use of shaft bearings for the auger, because the bearings and the necessary bearing supports would require an interruption in the flight and would interfere with the material flow. In contrast, the rollers 192 which are located at the upper extremity of the flight beneath the base casting 22 do not interfere with material flow and permit the flight 171 to extend without interruption, through the entire length of the trough 6.

Figure 8:
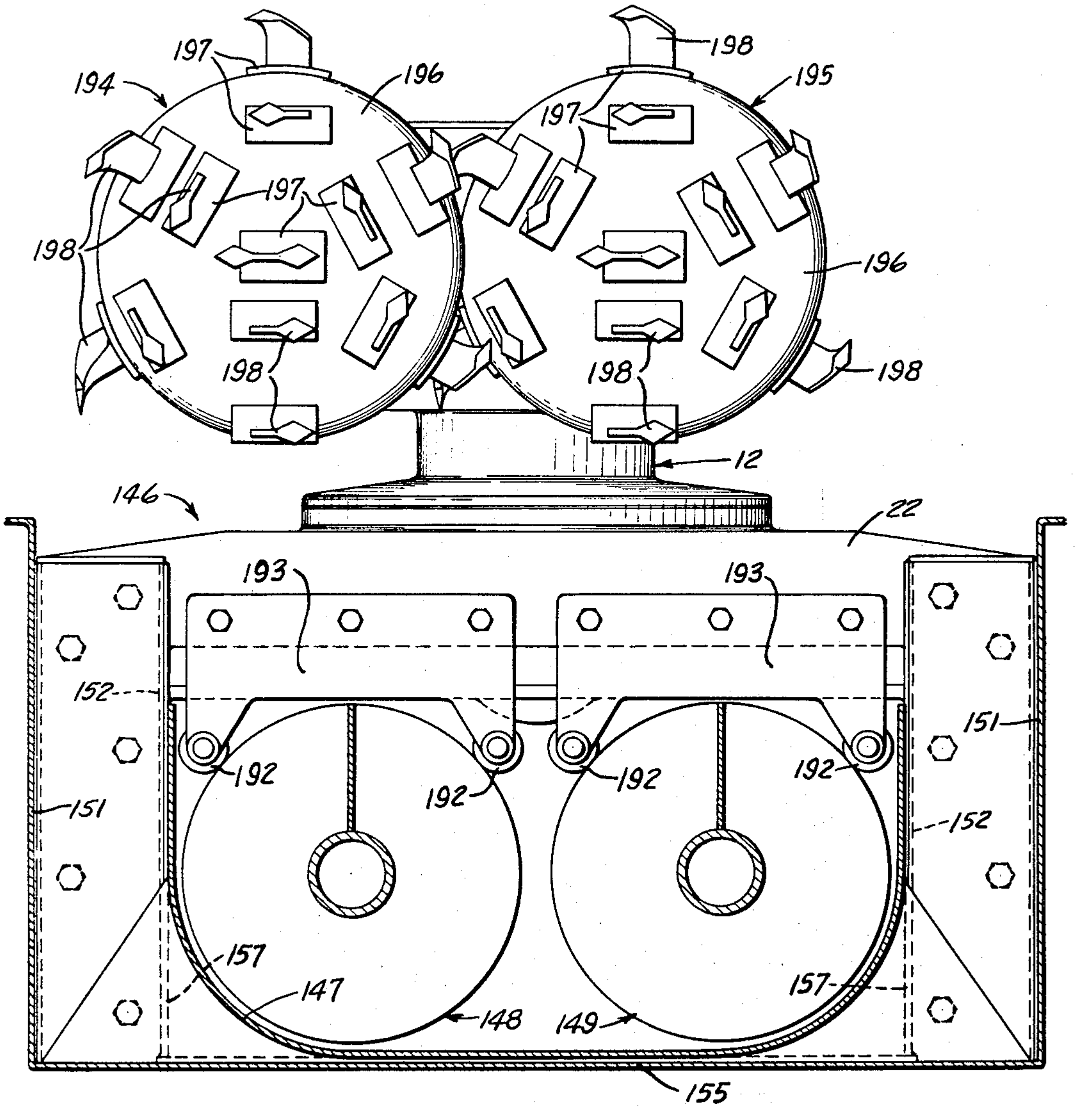
FIG. 8 is a vertical section taken through the conveyor housing and showing the entry tools in elevation.

The unloader of the invention also includes an entry mechanism which aids in initially installing the unloader within the silo after the silo is filled with silage or other stored material. The entry mechanism includes a pair of entry tools 194 and 195 which are located on the opposite side of the housing 12 from the cutter arm 5. Each entry tool 194 and 195 includes a generally convex or dome shaped head 196 and a series of lugs 197 are secured to each head and carry teeth 198 which project outwardly and are adapted to engage and dislodge the silage or other stored material as the unloader is moved into the silo. The teeth 198, as best shown in FIG. 8, are similar in nature to the teeth 27 on the cutter chain and have thin sharp edges in the direction of travel and enlarged diamond shaped heads which terminate in pointed tips facing in the direction of rotation of the tool. The heads 196 of tools 194 and 195 are offset and are not located in the same plane. This offset relationship provides a slight degree of overlap between the path cut by each tool so that the composite path cut by both tools 194 and 195 will be substantially equal to the combined cross-frontal area of the heads 196, as shown in FIG. 8.

The tool 194 is mounted on shaft 199 which is journaled within a hub 200 extending outwardly from the cap 16 on housing 12. The inner end of the shaft 199 carries a gear 201 which engages the gear 126.

Similarly, a shaft 202 is connected to the head 196 of entry tool 195, and the shaft is journaled within a hub 203 on cap 16. The inner end of shaft 202 carries a gear 204 which is engaged and driven by gear 122. As previously described, the gears 122 and 126 are driven from the shaft 49 and, thus, rotation of the shaft 49 will also serve to rotate the entry tools 194 and 195.

The cutter arm 5, the conveyor unit 7, the housings 64 and 147 are all an integral unit. To install the unloader in the silo, cutter arm 5 is positioned in vertical alignment with the housing 64 and conveyor unit 7. The entire unloader is then introduced into the outer end of the trough 6 and by operating the drive, the entry tools 194 and 195 will rotate to thereby cut or chew a path in the silage mass. The silage which is being cut and dislodged by the entry tools falls downwardly into the open housing 147 which is located beneath the entry tools on the opposite side of the base casting 22 from the housing 64. The silage is removed from the housing 146 by operation of the augers 148 and 149. The entire unloader is moved inwardly with the entry tools cutting a path in the silage until the flange 161 on housing 64 engages the frame 163 around the opening in the silo wall. With the flange in engagement with the frame, the unloader is properly positioned with respect to the silo.

The base ring assembly 37 which carries the pins 41 is formed in curved sections or segments and the section in alignment with the opening in the silo wall is removed prior to the introduction of the unloader within the opening so that the ring 37 will not interfere with the inward movement of the unloader. After the unloader has been properly positioned, the segment of the ring 37 is reinstalled and the sprocket 36 on the end of the cylinder cutter 10 is engaged with the pins. With the connection of the sprocket 36 to the pins 41, the unloader is then in condition for operation to remove silage.

When the drive mechanism is actuated, the sprocket 36 will rotate to successively engage the pins 41 and move the arm around the silo. As the cutter arm rotates, the cutter cylinders 9 and 10 will move into the silage mass and the teeth 27 will act to shred and dislodge the silage. The silage is then conveyed by the auger 11 toward the center of the silo where it falls within the open upper end of the trough housing 64 as well as the housing 146 where the augers 148 and 149 convey it outwardly within the housing to the exterior of the silo.

The unloader of the invention provides a substantial improvement in the capacity or delivery over the conventional bottom type unloading mechanism due to the fact that the cutter cylinders and conveying auger can operate at substantially higher speeds than the conventional chain-type cutter.

The present unloader also eliminates the inherent problems which are encountered with the use of the long endless cutter chain which contains numerous links, pins and other moving parts. The unloader of the invention decreases the number of moving parts, thereby eliminating many areas of potential wear as well as reducing problems of clogging, jamming or freezing of the moving parts.

As the entire unloader, including the cutter arm, conveyor and the housing, are an integral package, the unloader can be moved from silo to silo. This is a substantial advantage over prior art unloaders in which the unloader could only be used with a single silo. With the present unloader, a farm which may have several silos needs only to have a single unloader which can be moved from silo to silo for removal of the stored material as desired.

Various modes of carrying out the invention are contemplated as being within the scope of the following claims particularly pointing out and distinctly claiming the subject matter which is regarded as the invention.

I claim:

1. In an unloading mechanism for a storage structure, a material gathering arm mounted for rotation about the center of the structure and disposed to travel over the floor of the structure, comprising a material dislodging member extending from adjacent the center of the structure to the periphery, cutting means carried by the dislodging member and disposed to penetrate and dislodge the stored material, a conveying member disposed substantially parallel to the dislodging member and being generally coextensive therewith, said conveying member located to the rear, in the direction of travel, of said dislodging member, drive means for operating said dislodging member and said conveying member, and conveying means located at a level beneath said arm for conveying the dislodged material to the exterior of the structure.

2. In an unloading mechanism for a storage structure, a material gathering arm mounted for rotation about the center of the structure and disposed to travel over the floor of the structure, comprising, a pair of material dislodging members with each member extending from adjacent the center of the structure to the periphery thereof and the axes of said dislodging members being generally parallel and in vertical spaced relation, each dislodging member having a series of cutting elements on the surface thereof disposed to penetrate and dislodge the stored material, a conveying member associated with the dislodging members and disposed substantially parallel to said dislodging members and located to the rear of said dislodging members in the direction of rotation of said arm, drive means for rotating said dislodging members about the axes thereof to thereby cause said cutting elements to penetrate and dislodge the stored material, and second drive means for operating said conveyor member to move the dislodged material toward the center of the structure.

3. The structure of claim 2 in which said cutting elements constitute teeth having pointed tips facing generally circumferenially of said dislodging member and having enlarged heads following said tips, said tips adapted to penetrate into the stored material and said enlarged heads serving to shred and dislodge the material.

4. In an unloading mechanism for a storage structure, a material gathering arm mounted for rotation about the center of the structure and disposed to travel over the floor of the structure, comprising, a material dislodging member extending from adjacent the center of the structure to the periphery, a series of cutting members carried by the dislodging member and disposed to penetrate and dislodge the stored material, a conveying member disposed substantially parallel to the dislodging member and being coextensive therewith, said conveying member located to the rear, in the direction of travel, of said dislodging member, first drive means for rotating said dislodging member about its axis, second drive means for operating said conveying member to move the dislodged material toward the center of the structure, and third drive means associated with the outer end of one of said members for driving the arm in a rotary path around the structure.

5. The structure of claim 1 and including second drive means associated with the outer end of the dislodging member for moving the arm in a rotary path within the structure.

6. In an unloading mechanism for a storage structure, a material gathering arm mounted for rotation about the center of the structure and disposed to travel over the floor of the structure and including a material dislodging member extending from adjacent the center of the structure to the periphery, a series of cutting members carried by the dislodging member and disposed to penetrate and dislodge the stored material, an auger disposed substantially parallel to said dislodging member and located to the rear of said dislodging member in the direction of rotation of said arm, a shield enclosing the upper and rear portions of said auger and extending substantially the length of said auger, first drive means for rotating said dislodging member about its axis with said cutting member serving to penetrate and dislodge the stored material, second drive means for rotating said auger about its axis to thereby convey the stored material against the shield and toward the center of the structure, and conveying means disposed a a level beneath said dislodging member and said auger for conveying the dislodged material to the exterior of the structure.

7. The structure of claim 6 and including wheel means journalled on said shield and disposed beneath the level of said silage dislodging member and said auger, said wheel adapted to ride on the floor of the structure and support the arm in rotation.

8. In an unloading mechanism for a storage structure, a material gathering arm mounted for rotation about the center of the structure and disposed to travel over the floor of the structure, comprising, a pair of generally parallel dislodging members with the axes of said members being in vertical spaced relation and each dislodging member having cutting elements disposed to penetrate and dislodge the stored material, auger means disposed substantially parallel to the dislodging members and located to the rear of said dislodging members in the direction of rotation of said arm, the axes of said dislodging members lying on a circle having its center coinciding with the axis of said auger means, and drive means for simultaneously rotating said silage dislodging members and said auger means.

9. In an unloading mechanism for a storage structure, a material gathering arm mounted for rotation about the center of the structure and disposed to travel over the floor of the structure, comprising, a pair of generally parallel dislodging members with the axes of said members being in vertical spaced relation and each dislodging member having cutting elements disposed to penetrate and dislodge the stored material, auger means disposed substantially parallel to the dislodging members and located to the rear of said dislodging members in the direction of rotation of said arm, the axes of said dislodging members lying on a circle having its center coinciding with the axis of said auger means, first drive means for rotating said dislodging members in the same direction about their respective axes, and second drive means operably connected to asid auger means for rotating the auger means about its axis in the opposite direction from the direction of rotation of said silage dislodging members.

10. In an unloading mechanism for a storage structure, a material gathering arm mounted for rotation about the center of the structure and disposed to travel over the floor of the structure, comprising a hub located adjacent the center of the structure, a pair of dislodging members secured to the hub and extending outwardly from the hub to a location adjacent the periphery of the structure, said dislodging members being located one above the other and each dislodging member having a series of teeth extending generally circumferentially of said member, an auger having its inner end connected to said housing and extending generally parallel to the dislodging members, a shield having its inner end secured to the hub and located to the rear of said auger in the direction of rotation of said arm and extending upwardly to enclose the top of said auger, said hub, dislodging members auger and shield being an integral unit adapted to rotate around the silo, drive means for rotating said dislodging members about their axes, rotation of said dislodging members causing said teeth to penetrate and dislodge the stored material, and second drive means operably connected to the auger for rotating the auger about its axis to thereby convey the dislodged material toward the center of the structure.

11. The structure of claim 4 in which the third drive means including a shaft extending axially of said dislodging member, means connected to the inner end of the shaft for rotating said shaft, a sprocket carried by the outer end of said shaft, and a series of spaced projections mounted on the inner wall of the structure and disposed to be successively engaged by said sprocket as the sprocket is rotated to thereby rotate said arm within the structure.

12. The structure of claim 11 and including a wheel carried by the outer end of the shaft, and a rail extending inwardly from the wall of the structure, said wheel being arranged to ride on said rail as the arm is rotated within the structure.

13. In an unloading mechanism for a storage structure, a material gathering arm mounted for rotation about the center of the structure and disposed to travel over the floor of the structure, comprising, a dislodging member extending from adjacent the center of the structure to the periphery thereof, said dislodging member including an outer cylinder having cutting members disposed to penetrate and dislodge the stored material as the cylinder is rotated about its axis, first drive means operably connected to the outer cylinder for rotating said outer cylinder about its axis, a shaft journalled for rotation within said outer cylinder, a drive member carried by the outer end of said shaft, a series of projections located in spaced horizontal alignment on the inner wall of said structure and disposed to be successively engaged by said drive member, second drive means connected to the inner end of the shaft for rotating said shaft to thereby move the arm within the structure, a conveying member located to the rear of said dislodging member in the direction of rotation of said arm and disposed substantially parallel to said dislodging member, and third drive means for operating said conveying member to thereby convey the dislodged material toward the center of the structure.

14. The structure of claim 13 and including wheel means carried by the outer end of the shaft, a rail projecting inwardly from the inner wall of the structure, said wheel means adapted to ride on the track and support said dislodging member as the arm rotates within the structure.

15. The structure of claim 13 and including a shield member extending inwardly from the wall of the structure and covering said drive member and projections to thereby prevent the stored material from contacting said drive member and projections.

16. In an unloading mechanism for a storage structure, an auger journalled for rotation about a vertical axis at the center of the structure and extending from adjacent the center of the structure to the periphery thereof, drive mean connected to the inner end of the auger to rotate the auger about its axis and convey material inwardly toward the center of the structure, second drive means to rotate the auger about the center of the structure, said auger including a shaft and a spiral flight connected to said shaft, said shaft comprising a series of shaft sections with the innermost shaft section having the smallest diameter and each succeeding shaft section in a direction radially outward from the center of the structure having a progressively greater diameter, said flight having a uniform peripheral diameter throughout its length.

17. In an unloading mechanism for a storage structure, a dislodging member disposed to rotate about the center of the structure and extending from adjacent the center of the structure to the periphery and having a series of cutting elements disposed to penetrate and dislodge the stored material, an auger disposed substantially parallel to the dislodging member and located to the rear of the dislodging member in the direction of rotation of said dislodging member, a shield located on the opposite side of the auger from the dislodging member, said shield enclosing the rear and upper portions of said auger, drive means for rotating said dislodging member and said auger about their axes, said auger including a shaft and a spiral flight secured to said shaft, said shaft comprising a series of shaft sections with the innermost section having the smallest diameter and each succeeding shaft section in a direction radially outward from the center of the structure having a greater diameter, said spiral flight having a constant peripheral diameter throughout its length.

18. A storage structure, comprising a vessel to contain a stored material, a foundation to support the vessel and having a radially extending trough, a base unit located within the trough at the center of the vessel, said trough including a first trough section extending from the center of the foundation to the periphery and a second trough section aligned with the first trough section and extending from said center to a location beyond said center, a first housing section connected to the base unit and extending within the first trough section to the exterior of the vessel, a second housing section located within said second trough section and connected to the base unit, said base unit having an opening providing communication between said first housing section and said second housing section, material gathering means extending radially outward from said base unit for dislodging the stored material and moving it toward the center of the structure, and conveying means disposed within said first housing section and through said opening in the base unit and into said second housing section, said conveying means disposed to convey material through said housing sections to the exterior of the vessel.

19. The structure of claim 18 in which said conveying means constitutes an auger and said auger extends continuously from the outer end of said second trough section through said opening in the base unit and through said first housing section to the exterior of the vessel.

20. The structure of claim 18 and including abutment means secured to the outer surface of said first housing section and disposed to engage the outer wall of the vessel to thereby position the housing sections and base unit within said vessel.

21. The structure of claim 18 and including a generally U-shaped bottom member extending within said housing sections and through the opening in the base unit, said conveying means comprising a pair of generally parallel augers supported on said U-shaped member.

22. The structure of claim 18 and including an outlet door located in the bottom surface of the first housing section at a location on the exterior of the vessel.

23. In an unloading mechanism for unloading a stored material from a storage structure supported on a foundation with said foundation having a radially extending trough, a housing unit located within the trough at the center of the structure and having a generally horizontal opening therein, material gathering means extending outwardly from the housing unit and disposed to rotate across the foundation to dislodge the stored material, drive means located within said housing unit and connected to said material gathering means for rotating said material gathering means, said drive means being located above said opening, auger means located in the trough and extending within said opening in the housing unit for conveying the dislodged material to the exterior, roller means connected to the housing unit and located within said opening and engageable with the outer periphery of said auger means for journalling the auger means for rotation, the axis of said roller means being disposed parallel to the axis of said auger means.

24. In an unloading mechanism for unloading a stored material from a storage structure supported on a foundation having a trough in the upper surface thereof, a base unit located within the trough at the center of the structure, material dislodging means extending outwardly from the base unit and disposed to rotate over the foundation in a generally horizontal plane for dislodging the stored material, and cutting head means connected to the base unit and located diametrically opposite the dislodging means and disposed to rotate with rotation of the material dislodging means for cutting a path in the stored material when the unloading mechanism is initially installed within the structure.

25. The structure of claim 24 in which said cutting head means constitutes a pair of cutting heads with the axes of said heads lying in substantially the same horizontal plane.

26. The structure of claim 25 in which the cutting head is provided with a dome-like shape and a series of circumferentially arranged teeth are mounted on said dome-shaped head.

27. The structure of claim 24 in which the cutting head means comprises a pair of cutting heads with one of said heads disposed radially outward beyond the other head and said heads arranged to provide an overlap of cutting paths when the unloader is initially installed in the structure.

28. An unloading mechanism for unloading a stored material from a storage structure supported on a foundation with said foundation having a radially extending trough including a first trough section extending from the periphery to the center of said structure and having a second trough section aligned with said first trough section and extending beyond said center, a base unit located within the trough at the center of the structure, material dislodging means extending outwardly from the base unit and disposed to rotate over the foundation in a generally horizontal plane for dislodging the stored material and moving it toward the center of the structure and depositing said material in said trough, conveying means disposed within said trough for conveying the dislodged material to the exterior of the structure, and a cutting head connected to the base unit and disposed substantially opposite said material dislodging means and disposed to rotate with the rotation of said material dislodging means for cutting a path in the stored material when the unloading mechanism is initially installed within the structure, said cutting head being disposed above said second trough section when said silage dislodging means is disposed above the said first trough section.

29. An unloading mechanism for unloading a stored material from a storage structure supported on a foundation with said foundation having a radially extending trough including a first trough section extending from the periphery to the center of said structure and including a second trough section communicating with said first trough section and extending beyond said center, a base unit located within the trough at the center of the structure, material disloding means extending outwardly from the base unit for dislodging the stored material and moving it toward the center of the structure and depositing said material in said trough sections, a first housing section located within said first trough section and extending outwardly beyond the exterior of the structure, a second housing section located within said second trough section, said base unit having an opening providing communication between said first housing section and said second housing section, an auger disposed in said first housing section, said opening in the base unit and said second housing section and arranged to convey the dislodged material to the exterior of the structure, said first housing section having a discharge opening in the bottom surface thereof located outwardly of the structure, and blade means associated with the outer portion of said auger and located above said discharge opening for agitating and moving the dislodged material through said opening.

30. The structure of claim 29 in which said auger includes a spiral flight and said blade means comprises a blade secured to the outer end of said spiral flight and extending substantially parallel to the axis of said auger.

31. In an unloading mechanism for unloading a stored material from a storage structure, a rotatable material engaging member extending from the center of the structure to the periphery, first drive means for rotating said rotating member about its axis, a shaft journaled for rotation within said rotating member, second drive means for rotating said shaft, a drive member carried by the outer end of the shaft, a series of abutments positioned adjacent the wall of the structure and arranged to be successively engaged by the drive member as the shaft is rotated to rotate said rotating member about the center of the structure, a pair of flanges extending inwardly in vertical spaced relation from the wall of the structure, one of said flanges located above said abutments and the other of said flanges located below said abutments, and a roller carried by the outer end of said shaft and disposed to ride on said other flange as the rotatable member is rotated within the structure.

32. The unloading mechanism of claim 24, wherein said cutting head means includes a plurality of teeth adapted to penetrate and dislodge the stored material, and said mechanism includes means for rotating the head means about a horizontal axis to cause said head means to cut a path in the stored material when the unloading mechanism is initially installed within the structure.

33. The structure of claim 16, wherein the outer end of each shaft section is secured within an opening in the inner end of the next adjacent shaft section.

References Cited

UNITED STATES PATENTS

| | | | |
|---|---|---|---|
| 363,953 | 5/1887 | Alex-Godillot | 198—214 |
| 2,736,461 | 2/1956 | Dueringer et al. | 214—17 X |
| 2,864,655 | 12/1958 | Caron. | |
| 2,981,402 | 4/1961 | Cleaveland | 214—17 X |
| 3,035,718 | 5/1962 | Behlen | 214—17 |
| 3,127,032 | 3/1964 | Roberts | 214—17 |
| 3,232,457 | 2/1966 | Bernstein et al. | 214—17 |
| 3,233,755 | 2/1966 | Glenn | 214—17 |
| 3,254,777 | 6/1966 | Vandusen | 214—17 |

ROBERT G. SHERIDAN, *Primary Examiner.*